United States Patent [19]

Goff

[11] 4,052,167

[45] Oct. 4, 1977

[54] HEATING UNIT AND FERTILIZER PREPARATION

[76] Inventor: David C. Goff, 3000 NE. 48 St., Fort Lauderdale, Fla. 33308

[21] Appl. No.: 274,266

[22] Filed: July 24, 1972

[51] Int. Cl.$^2$ .................. C10L 5/00; A01G 13/00
[52] U.S. Cl. ................... 44/1 R; 44/16 R; 47/2; 71/64 A; 126/59.5
[58] Field of Search ............... 44/1 R, 10 R, 10 A, 44/10 B, 16 R, 17, 20; 47/2; 71/DIG. 64 SC, 64 A, 64 G, 62

[56] References Cited

U.S. PATENT DOCUMENTS

| | | | |
|---|---|---|---|
| 210,304 | 11/1878 | Du Motay et al. | 44/20 |
| 665,619 | 1/1901 | Springborn | 44/17 |
| 695,348 | 3/1902 | Steiner | 44/10 A |
| 830,086 | 9/1906 | Leadbeater | 44/10 B |
| 901,707 | 10/1908 | Herbein | 44/20 |
| 1,454,410 | 5/1923 | Robison | 44/10 A |
| 1,611,072 | 12/1926 | Reinau | 71/64 A |
| 1,929,300 | 10/1933 | Atkinson | 71/64 A |
| 2,877,599 | 3/1959 | Hebestreet | 44/16 R |
| 3,269,824 | 8/1966 | Aswell | 71/64 G |
| 3,351,444 | 11/1967 | Ryan et al. | 44/41 |
| 3,369,884 | 2/1968 | Barron | 71/62 X |

Primary Examiner—Carl F. Dees

[57] ABSTRACT

A heating unit consisting of a mixture and blend of a built in means including organic, inorganic materials, and fuels compressed into a generally stable solid, which, due to built in expanding force means, such as vermiculite ore embodies the function of the non-existant conventional liquid fuel container and heater for burning fuel with a regulated intensity rate and length of burn; the heating unit slowly self-destructs its mass, and by this burn method so alters or changes the left over or spent material, at least in part, as to cause it to become a useful fertilizer, said conditioner and plant nutrient. The organic materials may consist of paper, wood, organic muck, peat, and the like. The inorganic material may consist of phosphate, phosphate clay, limestone, dolomite, calcium, magnesium, sodium and the ore of the non-metallic mineral vermiculite, and the like. The fuel may be a liquid or solid hydro-carbons. The primary object of this invention is to provide an effective heating system for protection in agricultural areas where winter-time crops are grown and by virtue of said heating to provide an added benefit of fertilizer, which will in major part overcome the traditionally high cost of such heating.

19 Claims, 1 Drawing Figure

HEATING UNIT AND FERTILIZER PREPARATION

BACKGROUND OF THE INVENTION

In many areas of the country crops are grown in the wintertime. During the winter growing period, it is necessary at times, primarily in the low lying areas, to introduce heat to prevent loss of crops, plants, and trees from frost and cold temperatures. In the past, there have been many heating units and systems developed over the years for agricultural use, such as: metal heaters containing various fuels, wind machines, water systems, and the like. The heating units have been utilized to solve out-of-doors heating in face of cold tempteratures, wind velocity, contour of the ground, high or low inversion intensities of cold, acreage, etc. All of the prior known heating means require large capital investments, labor and logistic costs. Therefore, prior known heating units have been sparingly used, due to the law of deminishing returns. Most large agricultural growers do nothing and gamble on their losses, sometimes their losses are severe. There has long been a demand for a low-cost method and apparatus to aid agriculture in heating various areas threatened by cold waves.

BRIEF DESCRIPTION OF THE INVENTION

An ignitable, self-supportable burnable agriculture heating unit that produces a fertilizer. The combination heating unit and burnable heating unit fertilizer includes a compacted mixture of combustible organic solid materials, combustible fuels, and inorganic materials. The consumable organic materials and fuel may be as much as seventy percent of the heating unit by weight.

The organic solid material may be an organic flammable fiber of high insulation value such as shredded newsprint. The solid material is worked into a fibrous state and mixed with the inorganic material and the liquid fuel. The mixture of the materials and the fuel is compressed into a stable solid, self-supporting heating unit. The inner core of the heating unit is insulated from the heat of the burning surface by the compressed insulating material in the mass. The inorganic materials may include a commercial phosphate or ground phosphate pebbles or rock, which is about 50% phosphate and 50% phosphate clay, ground agricultural limestone, ground limestone, ground dolomite, ground ore of the non-metallic mineral, vermiculite. All materials are low cost and are readily commercially available.

The ore of the non-metallic mineral vermiculite or perlite allows the surface of the unit to maintain its burn intensity by flaking the burned surface off the heating unit. The ore of the non-metallic mineral vermiculite or perlite expands under the burn heat to rid the surface of the heating unit of the oxidized surface layer. The cleansing or scrubbing of the burned surface produces a generally constant rate of burn and heat intensity. Small particles and gases are carried off with the spent material to provide an agriculture fertilizer.

The present method and apparatus provides a means for heating various agriculture areas and for fertilizing said areas after burning. The method eliminates the cost of furnaces, and combines the labor distribution cost of heating and fertilizing.

In accordance with these and other objects which will be apparent hereinafter, the instant invention will now be described with particular reference to the accompanying drawing.

DESCRIPTION OF THE PREFERRED EMBODIMENTS

Figure 1:
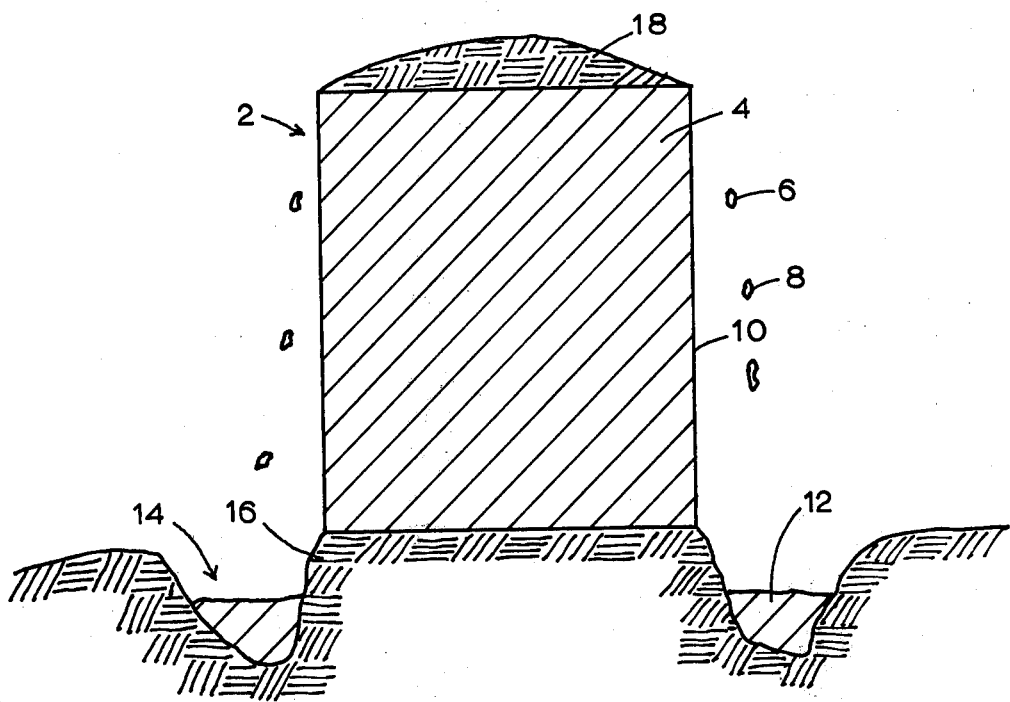
FIG. 1 is a cross sectional side view of the heating placed on the ground for burning.

The present invention pertains to a self-supporting burnable heater as shown in FIG. 1 of the Drawing, which will produce desired heat over a desired area, out of doors, and produce a fertilizer, soil conditioners and plant nutrients after the burn.

The heating unit 2 is compacted mixture 4 of combustable organic solid materials, such as paper, wood or peat, combustable fuels such as petroleum or coal, and inorganic materials such as phosphate, phosphate clay, vermiculite ore, limestone, dolomite and calcium. Combustible fuel is defined in this application as any material used to produce heat or power by burning, namely something that feeds fire. Combustible fuels are of the class of materials and their equivalents as set forth in this application, namely petroleum, coal and solid hydro-carbons. Liquid fuels are fuels that are in a liquid state.

The organic material may be waste paper, as newsprint processed through a hammer mill with a ⅛ inch screen. This material is light, porous, flammable, and fibrous. It will absorb and retain two times its own weight in liquids. In leiu of, or in combination with this material, dried organic fibrous muck or peat, or other fibrous, porous wood products may be used. Organic material is defined in this application as any materials derived from living organisms, such as plants or animals, that support combustion. Organic materials are of the class of materials or their equivalents that are set forth in this application, namely, paper, wood, peat, organic muck. Combustible or consumable organic materials are those that combust and give up heat by supporting a burn. Combustible organic solid materials are those in a solid state as opposed to a liquid state.

The inorganic materials may include a commercial phosphate or ground phosphate pebbles or rock, which is about 50% phosphate and 50% phosphate clay, ground agricultural limestone, ground limestone, ground dolomite, ground ore of the non-metallic mineral vermiculite or perlite. Inorganic material is any material being composed of mineral matter other than plant or animal matterr. Inorganic materials are of the class of materials or their equivalents that are set forth in this application, namely phosphate, phosphate clay, limestone, agricultural limestone, dolomite, calcium, magnesium, sodium and ore of vermiculite.

Before compression the mass of materials and fuel are proportioned, mixed and blended, then pressed, stamped or extruded into desired shapes and dimensions. The phosphate clay tends to clot, congeal, coagulate or flocculate the liquid fuel. This plus the holding power of the organic materials will generally prevent a loss of, or passage of the liquid fuel through the heating unit mass even though the heating unit of the liquid fuel is under high compression.

During the burn of the heating mass, the air exposed surfaces gradually and constantly separate and fall away, as shown at 6 and 8 from the mass surface 10 into a pile 12 in the soaking pit 14. The ore of the non-metallic mineral vermiculite is always at the burn surface, expands under heat to ten times or more or its original volume. This action forces out the burned material and any carbon formations which would curtail movement of the oxygen supply to the mass surface 10 for burning on a highly compressed mass. The fall out materials may land in a heap in a soaking pit below the bottom level of the burning mass. The heating unit may be placed on an earth mound 16. The top of the heating unit may be covered with sand 18 to prevent burning. The force means is material that compels by physical means the act of pushing material out of the heating unit, or the act of flaking the surface material off of the heating unit. The force means is of the class of materials or their equivalents that expand when heated, as set forth in this application, namely ore of vermiculite and perlite. The built-in force means is the force means within the heating unit. The automatic force means is the means automatically actuated by the heat from the burning surface.

A burn of 6 to 10 hours causes a destructive distillation of the heating unit mass and alterations of materials and fuel. The resultant gases are ammonia, hydrogen, nitrogen, sulfur, oxygen and solids or wood ash, carbon, sulphates and soluble carbonates as of sodium, ammonium, and potassium, more soluble phosphate, lime, magnesium, calcium, and other useful nutrients. The particles of solids fall into the pit, they carry some useful gases with them. Some gases are generated from the hot material in the pit. These gases in the soaking-pit are not readily lost to the cold winter upper air as the air above the pit is hot from the heating unit; neither will the gases be pulled upward by the heating unit as it is not of a high combustion order.

Over a period of hours, the gases and solids mingle in a pile in the pit and eventually a fixation takes place. As the mass of left-over or spent materials cools out, it may with the immediately adjacent soil or sand on which it rests, be used in the soil as a fertilizer to promote vigorous plant growth.

It is understood the material composition, the size and shape, and the burn method may vary and the foregoing merely illustrates one example of the units make-up and function.

The disclosed invention overcomes much of the objections of presently used heating devices. There is little, if any, capital investment, low labor cost, no maintenance and low manufacturer's costs. The units may be stored out of doors and used as required. The unit may be composed of fiborus, flammable, absorbative, organic materials and inorganic materials. Non-inflammable solids after these materials are blended with liquid and/or solid fuels, the whole may be pressed, stamped or extruded into any convenient shape of any desired dimensions. The units may be burned singly or in multiples, to meet any BTU input requirements. Due to the fibrous nature of the burn surface, the unit is easily ignited by the conventional torch or by an automatic temperature timing ignition device.

EXAMPLE I

An example of the combination heating unit and fertilizer producing unit of approximately one hundred pounds is as follows:

| | |
|---|---|
| Ground waste paper (organic material) | 25 lbs. by weight |
| Liquid Petroleum fuel | 45 lbs. by weight |
| Phosphate, phosphate clay, (inorganic material) ore of the non-metallic mineral vermiculite or perlite, limestone, dolomite, and calcium (inorganic material) | 30 lbs. by weight |

In said example, the unit volume would be approximately 2 cubic feet and the BTU input would be approximately 1 million BTU.

The above described example of a heating and fertilizer producing unit provides a generally low labor cost device. The compressed structural unit is its own container, and requires no special handling or storage facilities. The heating unit is a combination heater and fuel. The unit requires no maintenance or upkeep, and the unit may be provided with a light mesh or plastic rap to protect against hazards of transportation and weather.

In use, the above described example provides a hundred pound unit that may be approximately 16 inches in diameter by 18 inches in height to serve as its own fuel container due to the liquid holding and coagulating properties of the unit. The unit consumes itself and leaves fertilizing elements as a by-product. After ignition, the unit may have as much as 6 square feet of burning area on the compressed surface. The surface automatically is cleaned of carbon spent materials by the expanding force of ore of the non-metallic mineral vermiculite or perlite. This action is necessary because the unit is compressed and the oxidized material would sufficate the flames if it is not removed. The heat at the surface of the unit is transferred outwardly by radiation, conduction and conductance. Due to the compression and insulation value of the ground paper, the burn takes place principally on the surface of the unit. The length, rate and intensity of burn may be governed by the shape, dimension, fuel-type and fuel quantity of the unit. After the unit slowly disintegrates into particles and the spent organic derivatives fall off the burning surface, said particles and derivatives are saturated with distilled gases and carbon in a soaking pit at the foot of the unit. The materials are so altered in the soaking pit as to provide a more useful fertilizer.

A further example:

EXAMPLE II

| | |
|---|---|
| a) Ground Paper (organic) | 20 lbs. by weight |
| b) Liquid Fuel | 40 lbs. by weight |
| c) Ground Phosphate Rock (inorganic) | 15 lbs. by weight |
| d) High Calcium limestone (inorganic) and dolomite limestone (inorganic) | 15 lbs. by weight |
| e) Ore of the non-metallic mineral Vermiculite | 10 lbs. by weight |

The compressed mixture of items a through e Example II would have a volume of approximately 2 cubic feet. The mixture of items would approximately cost 1 dollar. The left-overs after the burn would generally be:

| | |
|---|---|
| Paper (organic) | 3 lbs. by weight |
| Liquid fuel | 10 lbs. by weight |
| Phosphate rock (inorganic) | 15 lbs. by weight |
| Limestone (inorganic) | 15 lbs. by weight |
| Ore of the non-metallic mineral Vermiculite | 10 lbs. by weight |
| Sand (inorganic) | 30 lbs. by weight |

An additional example:

EXAMPLE III

| a) Paper (organic) | 30 lbs. by weight |
|---|---|
| b) Liquid Fuel | 55 lbs. by weight |
| c) Ore of the non-metallic mineral Vermiculite | 15 lbs. by weight |

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A combination outdoor heating unit and plant nutrient producing unit comprising:
    a combustible mixture of a compressed mass providing a surface fire burning area,
    said mass including a mixture of,
    at least one compacted organic solid material, said organic material including a fuel that supports surface fire burning, and
    at least one inorganic material, said inorganic material includes an automatic built-in force means dispersed throughout said mass to rid the surface of the mass of the oxidized surface layer material, and to remove small surface particles from said compressed mass as the surface of the mass burns to provide a plant nutrient by-product after the combination unit is burned.

2. A combination heating unit and plant nutrient unit as set forth in claim 1 wherein:
    said mixture is compressed to a degree that would make fire burning area of said mass self-extinguishing without the automatic built-in force means.

3. A combination heating unit and plant nutrient producing unit as set forth in claim 1 wherein:
    said organic solid is paper, and
    said built-in means is an ore of non-metallic mineral vermiculite.

4. A combination heating unit and plant nutrient producing unit as set forth in claim 3 wherein:
    said inorganic material includes phosphates, limestone, dolomite and calcium.

5. A combination heating unit and plant nutrient producing unit as set forth in claim 2 wherein:
    said built-in means is a material that expands under heat to provide a built-in force to remove the outer surface layer of said unit.

6. A combination heating unit and plant nutrient producing unit as set forth in claim 2 wherein:
    the combustible organic material and fuel includes less than 90 percent of the mass by weight.

7. A combination heating unit and plant nutrient producing unit as set forth in claim 6 wherein:
    said inorganic material is less than the organic material of the mass by volume.

8. The method of providing heat and plant nutrient for agricultural areas by the following steps:
    mixing into a mass at least one organic material to provide a combustible, fuel-absorbing material,
    a fuel to provide heat during fire burning, and
    at least one inorganic material to provide a force means at the surface during fire burning,
    compressing said mass into a solid, and
    igniting the fire burning surface to protect agricultural areas by heating said areas and to remove surface particles from said mass to continue the surface burning and provide agricultural plant nutrients.

9. The method of providing heat and plant nutrients for agricultural areas as set forth in claim 8 wherein:
    said inorganic material comprises less than the amount or organic material of the mass by volume and the combustible portions of the mass comprises between 50 and 75 percent of the mass by weight.

10. The method of providing heat and plant nutrient agricultural areas as set forth in claim 8 including:
    using control means in said mass to direct the heat flow in the burning mass outwardly.

11. A heating unit comprising:
    a mixture of organic material,
    inorganic material, and
    liquid fuel that supports surface fire burning,
    said mixture of said organic, inorganic materials and fuel compressed into a generally stable solid, holding as much as 75 percent of the mixtures weight in fuel,
    said solid including an ignitable air exposed surface,
    said mixture providing means to control the flow and transfer of heat outward from the surface and the length of burn,
    said mixture providing additional force means for cleansing of the fire burning surface of spent material to insure a generally constant intensity and rate of burn, said spent material falls into a heap at the foot of said solid heating unit to the destructive deterioration of the mass and the increase in particle size of the left-over force means, whereby the force means are saturated and fixed by the burn gases and inorganic material and are slowly distilled to alter or change the materials to form useful fertilizer, soil conditioner and plant nutrients.

12. A compressible mass at least partially self-consumable by surface burning by fire to provide heat comprising:
    an automatic force means mixed in the mass to aid gravitation in the continuous burning by fire of the surface of the mass, said force means triggered by the heat of the surface burning in order to rid the surface of oxidized and other materials,
    said mass includes a formulated mixture of fuel, organic, and at least one inorganic material including said force means, said formulated mixture of known sources of materials that feed fires and known sources of materials that provide improved plant nutrients after burning,
    whereby said mass upon burning by fire provides radiant and convection heating of the immediate area and said spent material ejected from the surface of the mass by the force means or heat distilled and heat changed by the surface burning by fire to make available plant nutrients.

13. A mass including a dense-unexpanded inorganic ore of the non-metallic mineral vermiculite or perlite or the like for producing useful heat and plant nutrients comprising:
    a mass of a blended and formulated material having a fire burning surfce including,
    fuels to produce heat by burning to produce at least 100,000 BTU input per 100 pounds of mass,
    inorganic materials of known sources of plant nutrients, and
    said inorganic materials including a force means of a dense unexpanded inorganic ore of the non-metallic mineral vermiculite or perlite or the like, and said vermiculite or perlite or the like included in sufficient quantity and dispersed throughout the mass to provide upon being heated by the fire burning surface an expanding vermiculite or perlite or the like at the fire burn surface to act by force to provide a relatively clean fire burn surface and to eventually cause self-destruction of the mass by removing portions of the materials from the mass, and to provide a platey, laminated, porous, absorptive structure cavity means to hold and be saturated by gases from the heat distilled fuels and other materials and free nitrogen from the air after oxygen is used to support combustion at the fire burn surface for providing improved plant nutrients from the removed materials and gases.

14. A mass as set forth in claim 13 wherein:
said mass of blended and formulated materials including from 60–85% by weight of combustible materials.

15. A mass as set forth in claim 14 wherein:
said mass is compressed to a density of at least 50 pounds per cubic foot.

16. A method of producing heat by continuous surface combustion by fire of a mass by mechanical self-deterioration of the mass by the steps of:
mixing an organic material including combustible fuel, inorganic material, and a force means of inorganic ore of the non-metallic mineral vermiculite or perlite or the like into a mass, to provide a surface that supports combustion by fire.
said vermiculite or perlite or the like included in sufficient quantity and dispersed throughout the mass to provide proper surface cleaning to prevent extinguishing the fire on the burning surface,
igniting the surface of said mass to provide a fire burning surface,
said vermiculite or perlite or the like upon being heated by the burning surface will expand in and about the burn surface and the act of expansion will mechanically cleanse the burning surface of surface materials, whereby said mass gradually self-deteriorates and each layer of surface is exposed for burning in the atmosphere.

17. The method as set forth in claim 16 wherein
said force means is vermiculite ore,
said expanded vermiculite orein the expanded form provides by its platey, laminated, porous, absorptive structure cavity means to hold and be saturated by gases from the heat distilled fuels and other materials,
the expanded vermiculite ore and said spent materials are allowed to fall in small quantities into a soaking pit about the mass where final combustion and distillation of the gases takes place to provide the improved plant nutrients,
said fallen-expanded vermiculite ore provides insulation of the materials in the soaking pit from the burning mass to prevent reheating and resulting loss of gases in said expanded vermiculite.

18. The method as set forth in claim 17 wherein
the mineral vermiculite is used to provide plant neutrients such as potash magnesium and trace minerals for fertilizer and soil conditioning use.

19. A compressible mass at least partially self-consumable by surface burning by fire to provide heat comprising:
an automatic force means mixed in the mass to aid gravitation in the continuous burning by fire of the surface of the mass, said force means triggered by the heat of the surface burning in order to rid the surface of oxidized and other materials,
said mass including a formulated mixture of organic materials that feed fires, said mass includes a surface burnable by fire,
whereby said mass upon surface burning by fire provides radiant and convection heating of the immediate area.

* * * * *